I. R. TITUS.
Car-Couplings.
No. 155,996.
Patented Oct. 13, 1874.
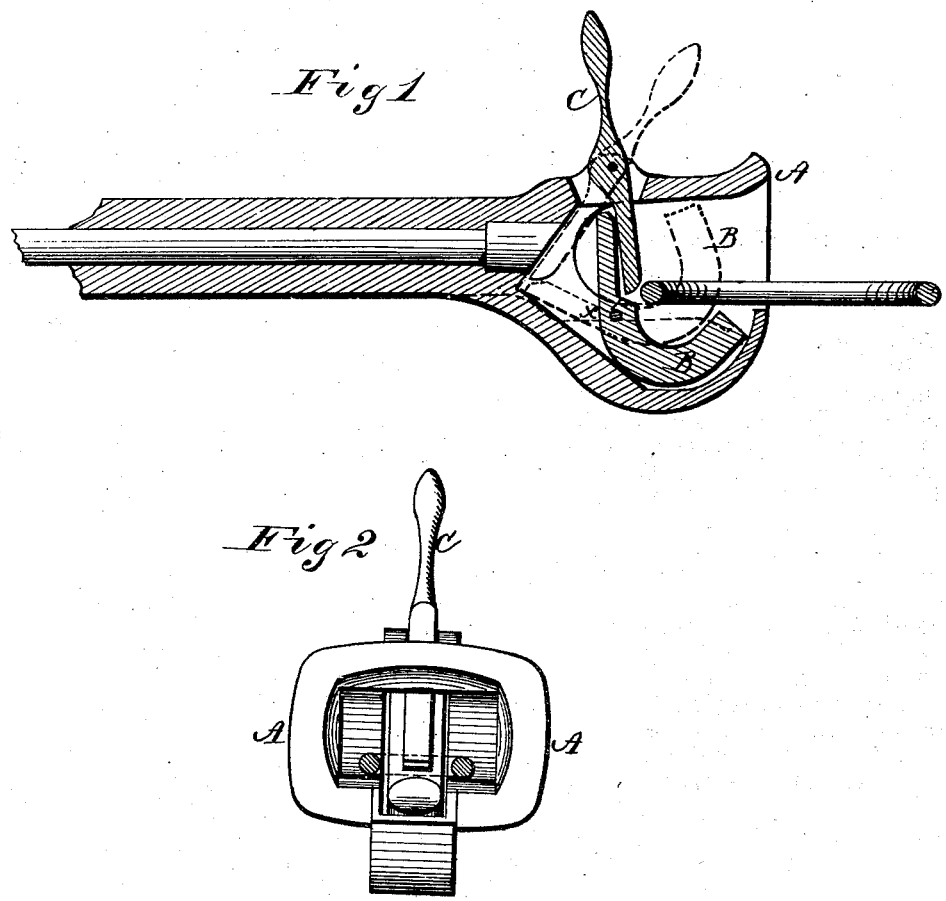
WITNESSES
INVENTOR
Attorneys

UNITED STATES PATENT OFFICE.

IVOR R. TITUS, OF HUNTINGTON, WEST VIRGINIA.

IMPROVEMENT IN CAR-COUPLINGS.

Specification forming part of Letters Patent No. 155,996, dated October 13, 1874; application filed September 5, 1874.

*To all whom it may concern:*

Be it known that I, IVOR R. TITUS, of Huntington, in the county of Cabell and in the State of West Virginia, have invented certain new and useful Improvements in Car-Coupling; and do hereby declare that the following is a full, clear, and exact description thereof, reference being had to the accompanying drawings and to the letters of reference marked thereon, making a part of this specification.

The nature of my invention consists in the construction and arrangement of the several parts of the coupler, the peculiarities of which will be hereinafter described.

In the accompanying drawings making part of this specification, Figure 1 represents a longitudinal section, and Fig. 2 a front view.

In the figures, A represents the draw-head, which is made in any of the well-known and usual ways. B represents a hook which is located near the mouth of the draw-head and a little below its center. The heaviest portion of this hook is at its forward end, as seen, and its pivot, which connects it to the draw-head, is below the point of draft. C represents a lever, which is pivoted in the upper shell of the draw-head. The lower end of this lever plays against the rear portion of the hook, and when the hook is raised, as seen in dotted lines, to hold the link, the lever stands with its end pressing or holding up the hook in such a manner that any downward draft presses the lever directly endwise, and thus securely locks the hook.

When the hook and lever stand, as seen in full line, Fig. 1, and the link strikes into the mouth of the draw-head, it carries the lever back and tilts the hook, throwing its forward end up so that it will catch into and retain the link. The link would remain in this position, even were it not for this lever, as its pivot is located below the line of draft, but when it is locked by the end of the lever there is no danger of its being thrown out of position or allowed to free the link, except by the use of the lever.

Cars may be uncoupled even while drawing heavy loads by throwing back the upper end of the lever. In this event it unlocks the hook and presses upon its forward end, tilting it sufficiently to allow the load to draw the link out from the hook.

This is a simple, convenient, cheap, and effective self-coupler, and one which can be easily added to the draw-head now in use.

Having thus fully described my invention, what I claim as new, and desire to secure by Letters Patent, is—

The hook B, in combination with the lever C and draw-head A, all to operate as and for the purpose set forth.

In testimony that I claim the foregoing I have hereunto set my hand this 2d day of September, 1874.

IVOR R. TITUS.

Witnesses:
H. A. HALL,
C. L. EVERT.